(12) United States Patent
Weissman et al.

(10) Patent No.: US 7,172,636 B2
(45) Date of Patent: *Feb. 6, 2007

(54) COMBUSTIBLE WOOD-BASED FUEL PACKAGE AND METHOD OF MANUFACTURE THEREOF

(75) Inventors: Gregg D. Weissman, Los Gatos, CA (US); Jennifer J. Young, Los Gatos, CA (US)

(73) Assignee: Summit Views LLC., Los Gatos, CA (US)

( * ) Notice: Subject to any disclaimer, the term of this patent is extended or adjusted under 35 U.S.C. 154(b) by 368 days.

This patent is subject to a terminal disclaimer.

(21) Appl. No.: 10/261,350

(22) Filed: Oct. 1, 2002

(65) Prior Publication Data
US 2003/0079400 A1 May 1, 2003

Related U.S. Application Data

(60) Provisional application No. 60/326,110, filed on Oct. 1, 2001.

(51) Int. Cl.
*C10L 5/00* (2006.01)
(52) U.S. Cl. .................... 44/541; 44/532; 44/533; 44/534; 44/542; 44/590
(58) Field of Classification Search ........... 44/532, 44/534, 541, 542, 590, 533
See application file for complete search history.

(56) References Cited

U.S. PATENT DOCUMENTS

| | | | |
|---|---|---|---|
| 175,858 A * | 4/1876 | Eldridge | 44/534 |
| 1,124,015 A | 1/1915 | Griffin | |
| 2,240,335 A | 4/1941 | Keil | |
| 2,548,379 A | 4/1951 | Lammersen | |
| 2,666,695 A | 1/1954 | Brody | |
| 2,799,563 A | 7/1957 | Shenker | |

(Continued)

FOREIGN PATENT DOCUMENTS

CA        868164    *    4/1971

(Continued)

OTHER PUBLICATIONS de Hoop, Cornelis F., *Assessment of Air Emissions of Environmentally Friendly Firelogs From Agricultrual and Wood Residues*, Southeastern Regional biomass Energy Program, Aug. 1998.

(Continued)

*Primary Examiner*—Cephia D. Toomer
(74) *Attorney, Agent, or Firm*—Marshall, Gerstein & Borun LLP

(57) ABSTRACT

A combustible wood-based package is disclosed which includes an outer wrapper, preferably formed from burlap or other similar woven material that encloses large pieces of wood material, medium pieces of wood material and smaller pieces of wood material coated or otherwise soaked in a vegetable wax to form an aggregate. The aggregate is disposed at or near the bottom of the burlap wrapper, with the medium-size pieces of wood material disposed thereon with the larger pieces of wood material disposed on top of the medium-sized pieces of wood material. Preferably, all wood materials are fabricated from all-natural wood logs fabricated from compressed wood particles without the use of odor causing binders.

20 Claims, 3 Drawing Sheets

U.S. PATENT DOCUMENTS

| | | |
|---|---|---|
| 2,963,352 A | 12/1960 | Davis |
| 3,252,770 A | 5/1966 | Fearon |
| 3,269,807 A | 8/1966 | Key, Jr. |
| 3,431,093 A * | 3/1969 | Kreinik .................. 44/542 |
| 4,063,904 A * | 12/1977 | Beeson .................. 44/520 |
| 4,775,391 A * | 10/1988 | Antosko ................ 44/520 |
| 5,421,836 A | 6/1995 | Ross |
| 5,456,732 A | 10/1995 | Baxter |
| 5,626,636 A | 5/1997 | Carter |

FOREIGN PATENT DOCUMENTS

| | | | |
|---|---|---|---|
| CA | 2190233 | * | 11/1996 |

OTHER PUBLICATIONS

Houston, Jr., James T., *The Development of a Firelog with Improved Air Emissions*, A Thesis, Dec. 1999.

* cited by examiner

COMBUSTIBLE WOOD-BASED FUEL PACKAGE AND METHOD OF MANUFACTURE THEREOF

CROSS-REFERENCE TO RELATED APPLICATION

This application claims the benefit under 35 U.S.C. § 119(e) of U.S. provisional patent application Ser. No. 60/326,110 filed Oct. 1, 2001, the disclosure of which is incorporated herein by reference.

TECHNICAL FIELD

A combustible fuel package containing pieces of wood material is disclosed. More specifically, a combustible fuel package includes an outer packaging or wrapper made from a woven combustible material, such as various types of burlap. The outer wrapper encloses or contains a plurality of pieces of wood material, such as compressed wood particles, and an accelerant which is coated onto smaller pieces of the wood material. The package can be easily lit with a match by engaging a lit match with the outer wrapper and an all-natural, esthetically appealing fire results. Small pieces of the compressed wood material can be soaked in the coating, which is preferably a vegetable wax, to form an aggregate. Further, the aggregate and medium-sized pieces of the wood material can be further contained within an inner package, and the inner package and larger pieces of wood material may then be contained within the outer wrapper for an improved combustible fuel package. Methods of manufacturing the above embodiments are also disclosed.

BACKGROUND OF THE RELATED ART

Convenient, easy to light fire logs are known. Typically, such fire logs are manufactured from compressed wood particles or sawdust and up to 60 wt. % petroleum-based waxes. They are molded into a single log-shaped piece and contained within an outer paper wrapper. The wrapper is lit which ignites the sawdust and wax fire log. The combination of the wax and the sawdust results in a log with a relatively low combustion threshold structure which burns reliably.

However, the above-described fire logs are not without their drawbacks. First, the inclusion of such large quantities of flammable petroleum-based wax material can result in unpleasant odors. Also, because the petroleum-based wax material is highly volatile, the products cannot be poked or rolled when burning as they have the propensity to break apart, causing the burning wax to flare dangerously. Also, multiple logs cannot be combined in a single fireplace because of the flare-up problem.

Fire logs made without waxes, accelerants or binders have also been developed. Instead of using wax as a binder and/or as an accelerant, sawdust is compressed under high pressure which causes lignin in the wood sawdust particles to fuse and the wood sawdust particles to mechanically bond, resulting in a bonding of the sawdust material into a solid log unit without needing the adhesive and binding characteristics of a petroleum wax. As a result, odor problems associated with the use of petroleum-based waxes are avoided. Further, more than one log can be combined in a fireplace for larger, but still safe fires.

However, the all-natural fire logs are also problematic because the lack of a wax or accelerant results in a fire log with a high combustion threshold thereby making them very difficult to ignite. Often, users have to resort to kindling, newspaper and/or other accelerants to get the fire started.

In the alternative, some all-natural fire logs come with complicated instructions for lighting which require the user to chop up portions of the log, position the smaller portions in a specific sort of arrangement with respect to the remaining log and use additional kindling material. Despite complying with the complicated instructions, users often fail to get the all-natural logs to ignite or light properly.

Accordingly, there is a need for an all-natural wood fire log which avoids the use of petroleum substances, which is easy to light and which also presents an esthetically appealing, odor-free fire.

SUMMARY OF THE DISCLOSURE

In satisfaction of the aforenoted needs, an improved combustible fuel package is disclosed. The disclosed combustible fuel package comprises an outer wrapper comprising a combustible material. In a preferred embodiment, the woven combustible material is one of many available types of burlap. However, other combustible materials made from plant materials can also be utilized. The outer wrapper encloses a plurality of pieces of wood material and a quantity of combustible coating or accelerant. The plurality of pieces of wood material can be divided into three groups: larger pieces, medium-sized pieces and smaller pieces. The small pieces of wood material, which may range from sawdust fragments, small chips of compressed wood, splinters and small chips of wood are coated with the coating or otherwise, can be combined with the coating to form an aggregate. The aggregate is placed toward the bottom of the outer wrapper, with the medium pieces of wood material disposed thereon and with the larger pieces of wood material disposed on top of the medium pieces. The outer wrapper is enclosed and, when placed upright in a fire place and lit, provides an easy-to-light, reliable and aesthetically appealing odor-free fire.

The wood material preferably comprises compressed wood particles. More preferably, the compressed wood particles do not include any petroleum-based binders but rely upon fused lignin and mechanical bonding to hold the sawdust particles together.

In an embodiment, the small pieces of wood material, which are coated with the coating, and the medium pieces of wood material are both contained within an inner wrapper disposed towards the bottom of the outer wrapper with the larger pieces of wood material disposed thereon. The inner wrapper is also fabricated from a combustible material, preferably a cornstarch material, burlap or another flammable woven plant-based product or paper. The inner wrapper prevents small pieces of aggregate and dust that is rubbed off of the medium-sized piece of wood material from leaking through the outer wrapper.

In an embodiment, the combustible coating is a vegetable wax. One such suitable vegetable wax is soy wax. While small quantities of petroleum waxes may be included, substantial amounts of petroleum waxes should be avoided due to the odor problem discussed above.

The combustible fuel packages may be manufactured as follows. First, if in a solid form, the combustible coating is melted. Then, the small pieces of wood material are combined with a coating to form an aggregate. The aggregate is then placed within the outer wrapper. The medium sized pieces are then laid thereon with the larger pieces lay on top of the medium sized pieces. If an inner wrapper is utilized, the aggregate is placed in the inner wrapper along with the medium pieces and the inner wrapper containing the aggregate and medium pieces are placed within the outer wrapper before the larger pieces of wood material are placed on top of the inner wrapper. The outer wrapper is then enclosed, with a decorative ribbon or tie, again preferably made from plant material.

BRIEF DESCRIPTION OF THE DRAWINGS

The invention is described more or less diagrammatically in the accompanying drawings wherein.

It should be noted that the drawings are not to scale and that the embodiments are illustrated by graphic symbols, phantom lines, diagrammatic representations and fragmentary views. In certain instances, details which are not necessary for an understanding of the disclosed combustible fuel packages or methods of manufacture thereof, or which render other details difficult to perceive, may have been omitted. It should be understood, of course, that this disclosure is not limited to the particular embodiments illustrated herein.

DETAILED DESCRIPTION OF THE PRESENTLY PREFERRED EMBODIMENTS

Figure 1:
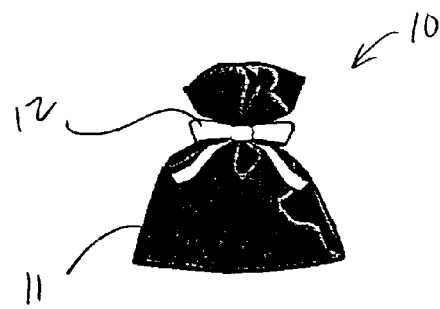
FIG. 1 is a front plan view of an assembled combustible fuel package made in accordance with this disclosure.

Turning to FIG. 1, a combustible fuel package 10 is illustrated which includes an outer wrapper 11 tied with a decorative bow or tie 12. Preferably, the outer wrapper 11 is fabricated from burlap or another combustible woven plant-based material. A less preferable alternative is paper. The tie 12 may also be fabricated from a combustible plant material such as a jute tie string or other decorative ribbon.

Figure 2:
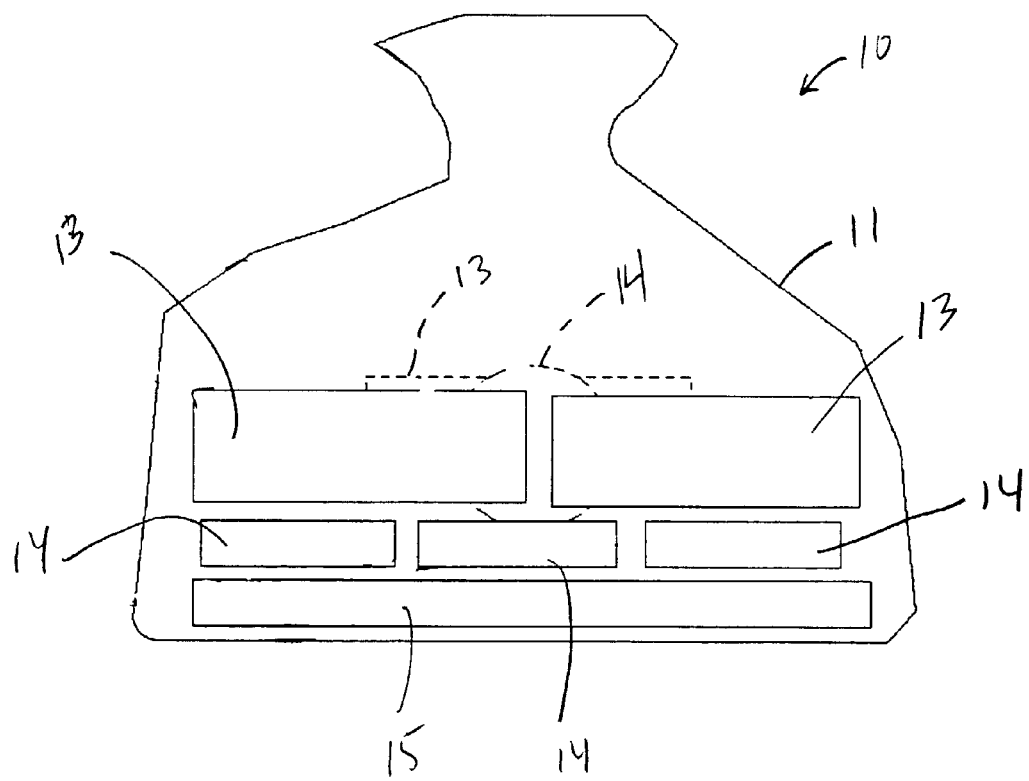
FIG. 2 is a front sectional view of one embodiment of a combustible fuel package made in accordance with this disclosure.

Turning to FIG. 2, a sectional view of one embodiment of a package 10 is illustrated. The package 10 includes the outer wrapper 11 as shown in FIG. 1 along with three sizes of wood material, preferably a compressed wood particle type material, as discussed above. Those three sizes are the larger sizes shown at 13, medium sizes shown at 14 and smaller sizes not shown but are contained within an aggregate shown at 15. The aggregate 15 is preferably formed from an accelerant, such as vegetable wax mixed with small pieces of wood material, such as sawdust, chips of compressed wood material, splinters, wood chips and the like. Small amounts of petroleum waxes may be included but their use should be limited due to their propensity to generate unpleasant odors. The aggregate 15 and the medium-sized pieces of wood material 14 provide adequate kindling for the larger pieces of wood material 13. Again, all of the wood material is preferably formed from compressed wood particles, such as sawdust. More preferably, the compressed wood material is sawdust highly pressurized using natural lignin as a bonding material with mechanical bonding as the binding mechanisms.

Figure 3:
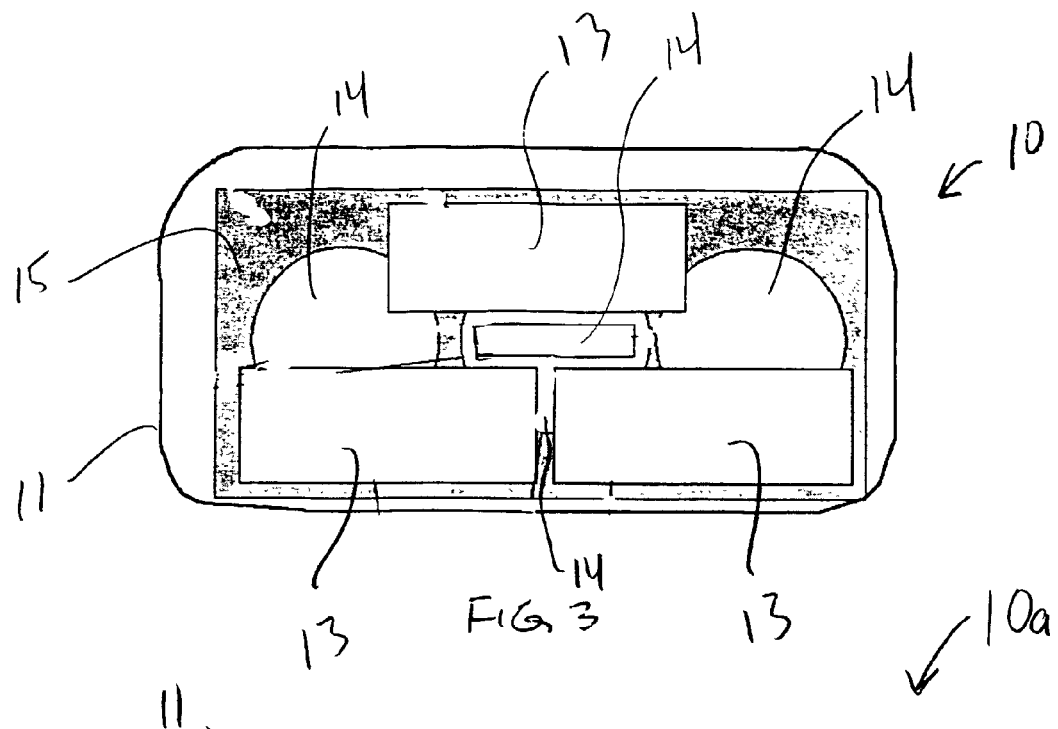
FIG. 3 is a top sectional view of the combustible fuel package shown in FIG. 2.

FIGS. 2 and 3 illustrate one particular arrangement for the pieces of wood material 13, 14 and aggregate 15 that has been found to be satisfactory. Specifically, the aggregate 15 is disposed at a bottom or lower portion of the outer wrapper 11. Three disc-shaped pieces of medium-sized wood material 14 are then placed on top of the aggregate 15. Then, three larger pieces of wood material 13 are then placed thereon and, optionally, an additional disc-shaped medium piece of wood material 14 is placed in an upright position between the three larger pieces of wood material 13.

Figure 4:
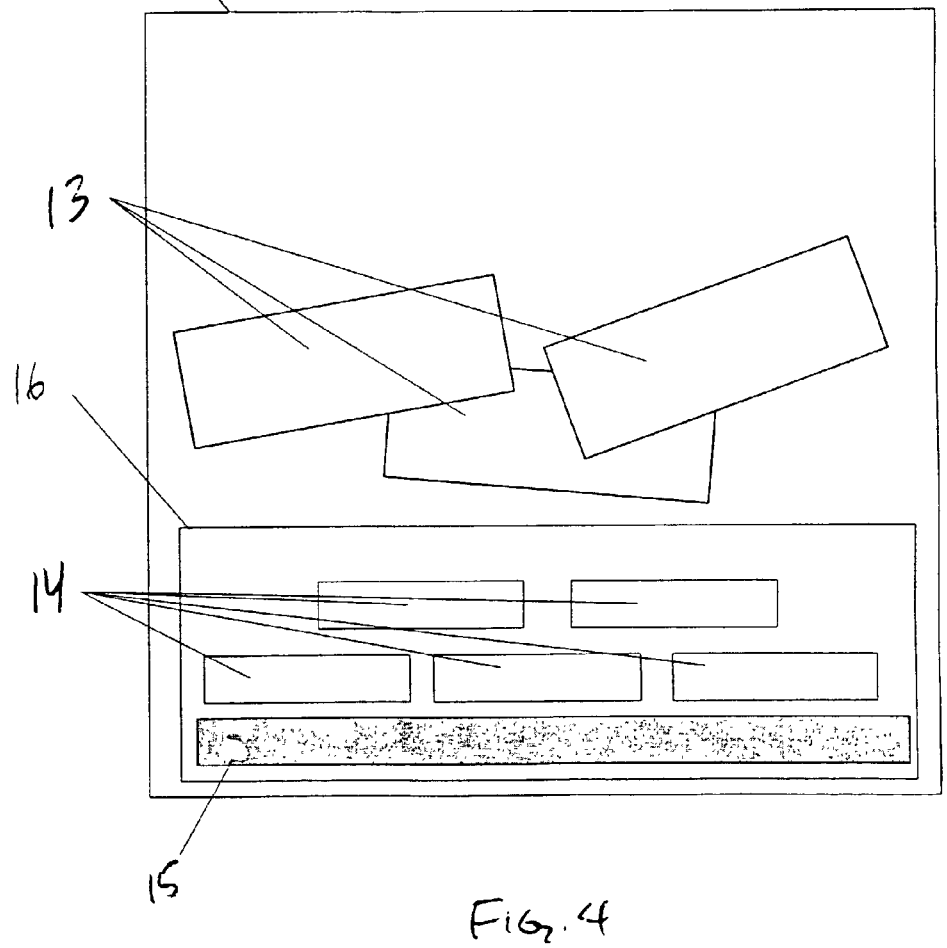
FIG. 4 is a front sectional view of another embodiment of a combustible fuel package made in accordance with this disclosure.
Figure 5:
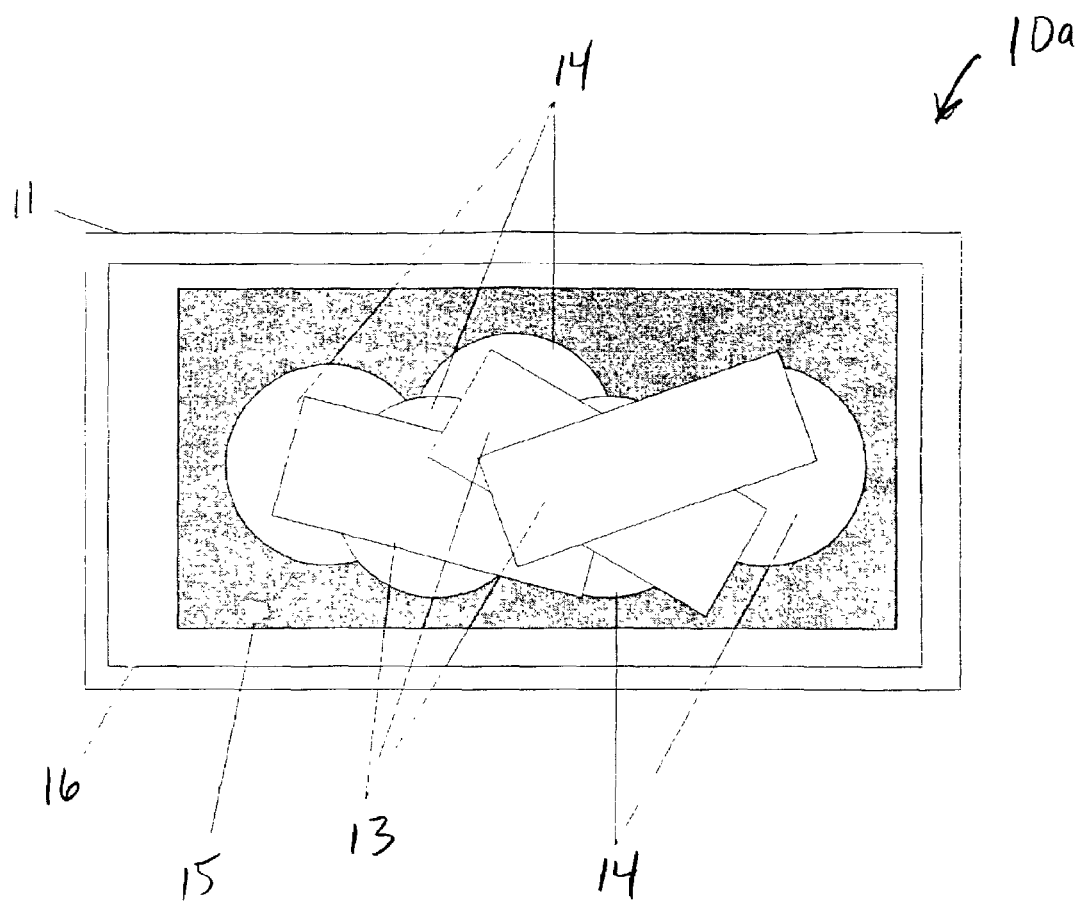
FIG. 5 is a top sectional view of the combustible fuel package shown in FIG. 4.

A more preferred embodiment is illustrated in FIGS. 4 and 5. Specifically, in the embodiment illustrated in FIG. 10a, an outer wrapper 11 serves an enclosure for large pieces of wood material 13 and an inner wrapper 16 which encloses a plurality of pieces of medium-sized wood material 14 disposed on top of the aggregate shown at 15. The inner wrapper 16 may be fabricated from a cornstarch product sold under the trademark MATER-B1 or completed cornstarch based bags sold under the trademark BIO-BAG (see http://www.polargruppen.com/biobag.htm). Alternatively, the inner wrapper 16 may be fabricated from burlap or, less preferably, paper. Again, the outer wrapper 11 can be enclosed or tied with a bow 12 or other suitable closure mechanism.

The burlap used for the outer wrapper 11 is made from jute, hemp or other organic fibers in a loose weave. The combustibility of such burlap fabrics, combined with its ability to be formed easily into a bag-like structure, together with its low cost, availability, all-natural content and image, provides for an ideal outer wrapper or packaging for the disclosed embodiments. All-natural paper wrappers or covers could also be utilized but would be less preferable.

The small, medium and large pieces of wood product are, again, preferably made from compressed wood materials. The consumer no longer needs to cut the preformed compressed particle wood logs into various sizes prior to arranging the various sizes in a predetermined structure prior to ignition. In the disclosed embodiments, the accelerant, preferably in the form of a vegetable wax in combination with smaller pieces of wood product, such as sawdust, small compressed particle chips, wood chips, splinters and the like is easily disposed near the bottom of the outer wrapper 11. Then, the kindling-like medium-sized pieces are disposed thereon prior to placement of the larger pieces on top of the medium pieces. The use of the inner wrapper 16 prevents small particles of aggregate 15 and particles shed from the medium-sized pieces 14 from leaking through the woven outer wrapper 11. However, the inner wrapper 16 is by no means a requirement for success.

To fabricate the structures 10, 10a, if a solid vegetable wax such as soybean wax is utilized, the wax is first melted, then the smaller pieces of wood product are combined with the molten wax to form the aggregate 15. The aggregate 15 is then placed at a bottom of an inner wrapper 16 or, if no inner wrapper 16 is used, placed towards the bottom of an outer wrapper 11. Then the medium-sized pieces 14 and larger sized pieces 13 are arranged as illustrated in FIGS. 2–3 or 4–5 prior to enclosing the outer wrapper 11 with a ribbon 12 or other suitable closing mechanism. The resulting product is safe to use, can be combined with other like products and provides for an environmentally friendly, odor-free and esthetically appealing fire.

One suitable all-natural fire log for the pieces of wood material used in the above-described embodiments is manufactured by West Oregon Wood Products, marketed under the name HIGH ENERGY HEAT LOGS. One suitable vegetable wax for the aggregate 15 is a soy wax such as ECOWAX CB135 sold by Bitter Creek Candle Supply, Inc.

While only two embodiments 10, 10a are disclosed, various other embodiments with different combinations of large and medium pieces 13, 14 in single or multiple constructions of the aggregate 15, along with additional pieces of small wood materials are also available and will be apparent to those skilled in the art.

While only certain embodiments have been set forth, alternative embodiments and various modifications will be apparent from the above description to those skilled in the art. These and other alternatives are considered equivalents and within the spirit and scope of this disclosure.

What is claimed is:

1. A combustible fuel package comprising:
   an outer wrapper comprising a woven combustible material, the outer wrapper enclosing a plurality of pieces of wood material and a quantity of a combustible coating,
   the plurality of pieces of wood material comprising at least one large piece, a plurality of medium sized pieces that are smaller than the at least one large piece and a plurality of small pieces that are smaller than the medium sized pieces, wherein the combustible coating is combined with wood pieces consisting of the small pieces of wood material.

2. The combustible fuel package of claim 1 wherein the woven combustible material is burlap.

3. A combustible fuel package comprising:
   an outer wrapper comprising a combustible material, the outer wrapper enclosing a plurality of pieces of wood material and a quantity of a combustible coating,
   the plurality of pieces of wood material comprising at least one large piece, a plurality of medium sized pieces that are smaller than the at least one large piece and a plurality of small pieces that are smaller than the medium sized pieces, wherein the medium and small pieces of wood material and the combustible coating are contained within an inner wrapper disposed within the outer wrapper, the inner wrapper comprising a combustible material
   the small pieces of wood material, being at least partially coated with the combustible coating.

4. The combustible fuel package of claim 3 wherein the combustible material of the inner wrapper is selected from the group consisting of cornstarch, burlap and paper.

5. A combustible fuel package comprising:
   an outer wrapper comprising a combustible material, the outer wrapper enclosing a plurality of pieces of compressed wood particles bound with lignin and a quantity of a combustible coating,
   the plurality of pieces of compressed wood particles comprising at least one large piece, a plurality of medium sized pieces that are smaller than the at least one large piece and a plurality of small pieces that are smaller than the medium sized pieces,
   pieces of wood consisting of the small pieces of compressed wood particles being at least partially coated with the combustible coating.

6. The combustible fuel package of claim 5 wherein the compressed wood particles are substantially free of wax.

7. A combustible fuel package comprising:
   an outer wrapper comprising a combustible material, the outer wrapper enclosing a plurality of pieces of wood material and a quantity of a combustible coating,
   the plurality of pieces of wood material comprising at least one large piece, a plurality of medium sized pieces that are smaller than the at least one large piece and a plurality of small pieces that are smaller than the medium sized pieces, wherein the combustible coating is combined with wood pieces consisting of the small pieces of wood material.

8. A combustible fuel package comprising:
   an outer wrapper comprising a combustible material, the outer wrapper enclosing a plurality of pieces of wood material and a quantity of a combustible coating,
   the plurality of pieces of wood material comprising at least one large piece, a plurality of medium sized pieces that are smaller than the at least one large piece and a plurality of small pieces that are smaller than the medium sized pieces,
   the pieces of wood consisting of small pieces of wood material being at least partially combined with the combustible coating, wherein the combustible coating comprises a vegetable wax.

9. The combustible fuel package of claim 8 wherein the vegetable wax is a soybean wax.

10. A combustible fuel package comprising:
    an outer wrapper comprising a woven combustible material, the outer wrapper enclosing a plurality of pieces of wood material, a quantity of a combustible coating and an inner wrapper, the inner wrapper comprising a combustible material selected from the group consisting of cornstarch, burlap and paper,
    the plurality of pieces of wood material comprising a plurality of large pieces, a plurality of medium sized pieces that are smaller than the large pieces and a plurality of small pieces that are smaller than the medium sized pieces,
    the small pieces of wood material being at least partially coated with the combustible coating and further being enclosed within the inner wrapper,
    the combustible fuel package being substantially free of petroleum accelerants.

11. The combustible fuel package of claim 10 wherein the woven combustible material is burlap.

12. The combustible fuel package of claim 10 wherein the pieces of wood material comprise compressed wood particles.

13. The combustible fuel package of claim 12 wherein the compressed wood particles are free of binders or wax.

14. The combustible fuel package of claim 10 wherein the small pieces of wood material are bound together with combustible coating to form an aggregate which is enclosed within the inner wrapper.

15. The combustible fuel package of claim 10 wherein the combustible coating comprises a vegetable wax.

16. The combustible fuel package of claim 15 wherein the vegetable wax is a soybean wax.

17. A method of manufacturing combustible fuel package, the method comprising:
    providing a combustible coating,
    providing a plurality of pieces of wood material comprising a plurality of large pieces, a plurality of medium sized pieces that are smaller than the large pieces and a plurality of small pieces that are smaller than the medium sized pieces,
    coating the small pieces of wood material with the combustible coating,
    placing the small pieces of wood material, the combustible coating and the medium pieces of wood material in an inner wrapper comprising a combustible material,
    placing the inner wrapper, with the small pieces of wood material, the combustible coating and the medium pieces of wood material disposed therein, and the large pieces of wood material within an outer wrapper comprising a combustible material, closing the outer wrapper so that the plurality of pieces of wood material, the inner wrapper and the combustible coating are enclosed therein.

18. The method of claim 17 wherein the combustible coating comprises a vegetable wax and the method further comprises melting the vegetable wax prior to coating the small pieces of wood material with the vegetable wax.

19. A method of manufacturing combustible fuel package, the method comprising:

providing a combustible coating, providing a plurality of pieces of wood material comprising a plurality of large pieces, a plurality of medium sized pieces that are smaller than the large pieces and a plurality of small pieces that are smaller than the medium sized pieces, coating pieces of wood consisting of small pieces of wood material with the combustible coating, placing the small pieces of wood material, the combustible coating, the medium pieces of wood material and the large pieces of wood material within an outer wrapper comprising a combustible material, closing the outer wrapper so that the plurality of pieces of wood material, the inner wrapper and the combustible coating is enclosed therein.

20. The method of claim 19 wherein the combustible coating comprises a vegetable wax and the method further comprises melting the vegetable wax prior to coating the small pieces of wood material with the vegetable wax.

* * * * *